United States Patent
Christian et al.

(10) Patent No.: US 9,772,956 B2
(45) Date of Patent: Sep. 26, 2017

(54) UNIVERSAL SERIAL BUS EMULATION OF A HOST CONNECTION

(71) Applicant: GOOGLE INC., Mountain View, CA (US)

(72) Inventors: Daniel A. Christian, Longmont, CO (US); Baird Jonathan Ramsey, Westminster, CO (US)

(73) Assignee: Google Inc., Mountain View, CA (US)

( * ) Notice: Subject to any disclaimer, the term of this patent is extended or adjusted under 35 U.S.C. 154(b) by 499 days.

(21) Appl. No.: 14/213,620

(22) Filed: Mar. 14, 2014

(65) Prior Publication Data
US 2015/0261697 A1    Sep. 17, 2015

(51) Int. Cl.
*G06F 13/10* (2006.01)
*G06F 13/38* (2006.01)

(52) U.S. Cl.
CPC .......... *G06F 13/107* (2013.01); *G06F 13/105* (2013.01); *G06F 13/385* (2013.01); *G06F 2221/034* (2013.01)

(58) Field of Classification Search
CPC .... G06F 13/105; G06F 13/107; G06F 13/385; G06F 2221/034; G06F 11/26; G06F 11/261; G06F 11/36
See application file for complete search history.

(56) References Cited

U.S. PATENT DOCUMENTS

| | | | | |
|---|---|---|---|---|
| 6,366,877 B1 * | 4/2002 | Nishino | ................ | G06F 13/105 703/25 |
| 6,393,588 B1 * | 5/2002 | Hsu | ...................... | G06F 11/261 710/105 |
| 6,785,845 B2 * | 8/2004 | Venkataraman | .... | G06F 11/3672 235/437 |
| 7,464,044 B2 | 12/2008 | Conrad et al. | | |
| 7,660,937 B2 | 2/2010 | Frantz et al. | | |
| 7,752,029 B2 * | 7/2010 | Tamayo | ................ | G06F 13/105 703/21 |
| 8,069,356 B2 * | 11/2011 | Rathi | ........................ | G06F 1/26 713/300 |
| 9,418,181 B2 * | 8/2016 | Myrick | ................. | G06F 13/385 |
| 2001/0018646 A1 * | 8/2001 | Nagashima | ........... | G06F 11/261 703/13 |

(Continued)

OTHER PUBLICATIONS

Compaq, et al. "Universal Serial Bus Specification Revision 2.0" (2000).*

(Continued)

*Primary Examiner* — Kamini S Shah
*Assistant Examiner* — Jay B Hann
(74) *Attorney, Agent, or Firm* — McDermott Will & Emery LLP

(57) ABSTRACT

A system and method for emulating a universal serial bus device is disclosed. An example embodiment may include an emulated USB (EUP) device that can emulate a host side of a USB connection. This device may have a microcontroller that is programmable with software to emulate a host connection of a physical USB device. In order to emulate a host connection of a USB device, the EUP device may configure USB host mode bus signals, initiate USB frames on the bus, indicate device status to an emulation process, and relay packets between a device and the emulation process.

14 Claims, 12 Drawing Sheets

(56) References Cited

U.S. PATENT DOCUMENTS

| | | | | |
|---|---|---|---|---|
| 2006/0190238 A1* | 8/2006 | Autor | ................... | G06F 13/105 |
| | | | | 703/25 |
| 2007/0299650 A1 | 12/2007 | Tamayo et al. | | |
| 2008/0021693 A1* | 1/2008 | Campbell | ............. | G06F 13/105 |
| | | | | 703/21 |
| 2009/0216517 A1* | 8/2009 | Herbst | ................... | G06F 11/26 |
| | | | | 703/21 |
| 2011/0307847 A1 | 12/2011 | Liao et al. | | |

OTHER PUBLICATIONS

Capture USB Printer port, RedTitan Technology, 2014, http://www.pclviewer.com/resources/capture/print2usb.html [retrieved Mar. 14, 2014].
DIY USB adapter, GIMX, http://gimx.fr/wiki/index.php?title=DIY_USB_adapter [retrieved Mar. 14, 2014].
USB Rubber Ducky, http://192.65.85.110/index.php, [Retrieved Mar. 14, 2014].
International Search Report mailed May 8, 2015 for International Application No. PCT/US2015/020463.
Written Opinion of the International Searching Authority mailed May 8, 2015 for International Application No. PCT/US2015/020463.
Office Action dated Oct. 5, 2016 in U.S. Appl. No. 14/213,472.
Office Action dated Dec. 21, 2016 in U.S. Appl. No. 14/213,472.
Notice of Allowance dated Mar. 14, 2017 in U.S. Appl. No. 14/213,472.

* cited by examiner

USB packet types:
    SETUP - control command from host to device
        IN     - data transfer from device to host
        OUT  - data transfer from host to device

| Setup command | Addr | Endpt | Len | Data |
|---|---|---|---|---|
| IN Get_Descriptor | 0 | 0 | 64 | 12 01 00 02 09 00 00 40 ac ... |

| Setup command | Addr | Endpt | Len | Data |
|---|---|---|---|---|
| OUT Set_Address | 0 | 0 | 0 | |

| Setup command | Addr | Endpt | Len | Data |
|---|---|---|---|---|
| IN Get_Descriptor | 1 | 0 | 18 | 12 01 00 02 09 00 00 40 ac ... |

| Setup command | Addr | Endpt | Len | Data |
|---|---|---|---|---|
| IN Get_Descriptor | 1 | 0 | 9 | 09 02 19 00 01 01 00 a0 28 |

| Setup command | Addr | Endpt | Len | Data |
|---|---|---|---|---|
| IN Get_Descriptor | 1 | 0 | 25 | 09 02 19 00 01 01 00 a0 28 ... |

| Setup command | Addr | Endpt | Len | Data |
|---|---|---|---|---|
| IN Get_Descriptor | 1 | 0 | 255 | 06 03 09 04 04 04 |

| Setup command | Addr | Endpt | Len | Data |
|---|---|---|---|---|
| IN Get_Descriptor | 1 | 0 | 255 | 1a 03 4b 00 65 00 79 00 62 ... |

| Setup command | Addr | Endpt | Len | Data |
|---|---|---|---|---|
| IN Get_Descriptor | 1 | 0 | 255 | 18 03 41 00 70 00 70 00 6c ... |

| Setup command | Addr | Endpt | Len | Data |
|---|---|---|---|---|
| IN Get_Descriptor | 1 | 0 | 255 | 1a 03 30 00 30 00 30 00 30 ... |

| Setup command | Addr | Endpt | Len | Data |
|---|---|---|---|---|
| OUT Set_Configuration | 1 | 0 | 0 | |

| Setup command | Addr | Endpt | Len | Data |
|---|---|---|---|---|
| IN Get_Descriptor | 1 | 0 | 15 | 09 29 03 8d 00 32 50 04 ff |

| Setup command | Addr | Endpt | Len | Data |
|---|---|---|---|---|
| IN Get_Status | 1 | 0 | 2 | 00 00 |

| Setup command | Addr | Endpt | Len | Data |
|---|---|---|---|---|
| IN Get_Status | 1 | 0 | 4 | 01 00 00 00 |

| Setup command | Addr | Endpt | Len | Data |
|---|---|---|---|---|
| OUT Set_Feature | 1 | 0 | 0 | |

| Setup command | Addr | Endpt | Len | Data |
|---|---|---|---|---|
| OUT Set_Feature | 1 | 0 | 0 | |

| Setup command | Addr | Endpt | Len | Data |
|---|---|---|---|---|
| OUT Set_Feature | 1 | 0 | 0 | |

| Setup command | Addr | Endpt | Len | Data |
|---|---|---|---|---|
| IN Get_Status | 1 | 0 | 4 | 00 01 00 00 |

| Setup command | Addr | Endpt | Len | Data |
|---|---|---|---|---|
| IN Get_Status | 1 | 0 | 4 | 01 01 01 00 |

| Setup command | Addr | Endpt | Len | Data |
|---|---|---|---|---|
| OUT Clear_Feature | 1 | 0 | 0 | |

| Setup command | Addr | Endpt | Len | Data |
|---|---|---|---|---|
| IN Get_Status | 1 | 0 | 4 | 00 01 00 00 |

| Setup command | Addr | Endpt | Len | Data |
|---|---|---|---|---|
| IN Get_Status | 1 | 0 | 4 | |

FIG. 1b
Prior Art

```
configurations = (
  (0, 0, 0, 255, 0x8), # confD_off, strD_off, report_start, report_last, EP0_sz
  )

device_descriptor = (
  HexStr(
    "12 01 10 01 00 00 00 08 "
    "F0 03 24 03 04 01 01 02 "
    "00 01"),
  )

configuration_descriptor = [
  HexStr(
    "09 02 22 00 01 01 00 A0 32 " # configuration
    "09 04 00 00 01 03 01 01 00 " # interface
    "09 21 10 01 00 01 22 41 00 " # HID interface
    "07 05 81 03 08 00 0A")]      # endpoint string_descriptor[0] = \
  HexStr(
    "04 03 09 04")
string_descriptor[1] = \
  HexStr(
    "32 03 4C 00 69 00 74 00 " # 'Liv'
    "65 00 2D 00 4F 00 6E 00 " # 'e-On'
    "20 00 54 00 65 00 63 00 " # ' Tec'
    "68 00 6E 00 6F 00 6C 00 " # 'hnol'
    "6F 00 67 00 79 00 20 00 " # 'ogy '
    "43 00 6F 00 72 00 70 00 " # 'Corp'
    "2E 00")                   # '.'
```
┌─────────────────────────────────────────┐
│ string_descriptor[2] = \                │
│   HexStr(                               │
│     "2C 03 48 00 50 00 20 00 " # 'HR '  │
│     "42 00 61 00 73 00 69 00 " # 'Basi' │─ 401
│     "63 00 20 00 55 00 53 00 " # 'c US' │
│     "42 00 20 00 4B 00 65 00 " # 'B Ke' │
│     "79 00 62 00 6F 00 61 00 " # 'yboa' │
│     "72 00 64 00")       # 'rd'         │
└─────────────────────────────────────────┘

FIG. 4a

```
reports = [
 (0x00, 0x03, 0x0001, 0x0000, 0x0000, 0,
  ''), # 00 03 01 00 00 00 00 00  H2D std dev Set_Feat d=1 i=0 l=0
 (0x21, 0x09, 0x0200, 0x0000, 0x0001, 0,
  ' '), # 21 09 00 02 00 00 01 00  H2D std int Set_Conf d=512 i=0 l=1
 (0x21, 0x0a, 0x0000, 0x0000, 0x0000, 0,
  ''), # 21 0a 00 00 00 00 00 00  H2D std int Get_Inter d=0 i=0 l=0
 (0x21, 0x0a, 0x0600, 0x0000, 0x0000, 0,
  ''), # 21 0a 00 06 00 00 00 00  H2D std int Get_Inter d=1536 i=0 l=0
 (0x21, 0x0b, 0x0001, 0x0000, 0x0000, 0,
  ''), # 21 0b 01 00 00 00 00 00  H2D std int Set_Inter d=1 i=0 l=0
 (0x81, 0x06, 0x2200, 0x0000, 0x0041, 0,
  HexStr( # 81 06 00 22 00 00 41 00  D2H std int Get_Desc d=8704 i=0 l=65
   '05 01 09 06 '       # Usage_page(0x1), usage(0x6)
   'a1 01 '             # COLLECTION(application)
   '05 07 19 e0 '       # Usage_page(0x7), usage_min(224)
   '29 e7 15 00 '       # usage_max(231), Logical_min(0)
   '25 01 95 08 '       # Logical_max(1), Count=8
   '75 01 81 02 '       # Size=1, INPUT(variable)
   '95 08 75 01 81 01 ' # Count=8, Size=1, INPUT(constant,array)
   '05 08 19 01 '       # Usage_page(0x8), usage_min(1)
   '29 03 95 03 '       # usage_max(3), Count=3
   '75 01 91 02 '       # Size=1, OUTPUT(variable)
   '95 01 75 05 91 01 ' # Count=1, Size=5, OUTPUT(constant,array)
   '05 07 19 00 '       # Usage_page(0x7), usage_min(0)
   '2a ff 00 15 00 '    # usage_max(255), Logical_min(0)
   '26 ff 00 95 06 '    # Logical_max(255), Count=6
   '75 08 81 00 '       # Size=8, INPUT(array)
   'c0 '                # END_COLLECTION,
  )),
]

for ii in range(len(device_descriptor)):
 SetMessage(MSG_DEVICE_DESCRIPTOR, ii, device_descriptor[ii])

for ii in range(len(configuration_descriptor)):
 SetMessage(MSG_CONFIGURATION, ii, configuration_descriptor[ii])

for strd in sorted(string_descriptor):
 SetMessage(MSG_STRING, strd, string_descriptor[ii])

for ii in range(len(reports)):
 SetMessage(
   MSG_RESPONSE, ii, msg,
   mask=mask, rtype=rtype, request=request, value=value,
   index=index, length=length,
   endpoint=endpoint, reuse=reuse)
```

FIG. 4b

```
def test_03_catfood_qty_2upc(self):
    """Many Catfood_QTY_2UPC case

Scan loyalty for Catfood_QTY_2UPC
    Scan items in input_sequence...
    TOTAL
    CashOut()"""
    input_sequence = (
        "Scan(404000003205) Sleep(%(lookup_delay)s) '19' QTY Scan(01113200003) "
        "Scan(01113200010) Sleep(%(total_delay)s) TOTAL WaitTotal() "
        "Sleep(%(post_total_delay)s) CashOut()")
    input_sequence = input_sequence % self.config
    self.meup.Input(input_sequence)
    self.expect['loyalty_ids'] = {'40400000320' : 1}
    self.expect['item_ids'] = {'01113200003' : 19, '01113200010' : 1}
    self.expect['expected_responses'] = 1
    self.expect['total_discount'] = (-1, )
```

FIG. 6a

UNIVERSAL SERIAL BUS EMULATION OF A HOST CONNECTION

BACKGROUND

Computing devices may connect with peripheral devices such as mice, keyboards, printers, speakers, scanners, microphones, and web cameras via the Universal Serial Bus (USB), which is an industry standard that defines communication protocols between computing devices and peripheral devices. With USB, a host computing device (105) uses a bus enumeration process to identify and manage the state of USB devices (107) when the USB devices (107) are attached or removed from a USB port connected to (or on) the host computing device (105). The host/device relationship is illustrated in FIG. 1a. Each device (107) identifies itself using a series of descriptor messages in the enumeration process. The descriptor messages use a well-defined protocol and can be recorded using a USB analyzer, as illustrated in FIG. 1b (101). FIG. 1b shows various commands sent between a USB device and a host computing device in order to communicate. Typically, a device descriptor includes a device ID, strings, and report descriptors. An example device descriptor is shown in FIG. 4a (401). Additional messages may define the input, outputs, and statuses of the devices.

Many conventional computing systems, such as point of sale (POS) systems, require multiple USB peripheral devices in order to properly function. For example, computing systems may include a USB keyboard, a USB mouse, and a USB scanner/printer. It is critical to test the computing system and the interactions with all peripheral devices to determine whether the computing system is working correctly. These systems may require a physical connection between a USB device and a computing device to test USB device/host interaction.

Tests should verify how a computing device or system under test responds to peripherals and also verify that applications and/or systems, which require specific peripherals, function properly. To test and verify a system's interaction with peripherals, it is customary to perform manual data entry and verification procedures for each peripheral device that can be connected to the system. Manual entry is required for each device because each device presents itself with unique USB identifications and simple generic interface testing does not verify the specific features of each device. Furthermore, when testing a system or application that requires specific USB peripherals, such as special keyboards, it is customary to perform manual testing and validation using the full system. These testing methods are prone to errors and may need to be repeated to guarantee accuracy.

As recognized by the inventors, there should be a way to automatically emulate peripheral devices in systems to be tested, while minimizing errors and ensuring accuracy.

SUMMARY

This specification describes technologies relating testing USB hardware device interaction within computing systems in general, and specifically to methods and systems that can emulate multiple USB host connections when testing computing devices and/or systems.

In general, one aspect of the subject matter described in this specification can be embodied in an emulating universal serial bus (USB) hardware device that emulates a host connection of a USB device in a computing system and a computing system for testing peripheral device interaction and host connections.

An example emulating USB hardware device includes: a memory to store configuration descriptors; a USB to serial interface chip; and one or more microcontrollers with USB support that is programmable with software to emulate a host connection of a physical USB device by receiving software that configures USB host mode bus signals, initiates USB frames on a serial bus, indicates a device connection status to a device emulation process, and relays packets between a physical USB device and the device emulation process.

An example computing system for testing peripheral device interaction and host connections includes: a test executor computing device configured to run a testing framework, host connections, and emulating USB hardware device communication drivers; a computing device under test; a physical USB peripheral device; and at least one emulating universal serial bus (USB) hardware device that is programmable with software to emulate a host connection of a physical USB device, wherein the at least one emulating universal serial bus hardware device is configured to configure USB host mode bus signals; initiate USB frames on a serial bus; indicate a device connection status to a device emulation process; and relay packets between the physical USB peripheral device and the device emulation process.

These and other embodiments can optionally include one or more of the following features. An example emulating USB hardware device may include one or more input/output ports on the one or more microcontrollers that provides additional functionality for the emulating USB hardware device. The one or more input/output ports may control power to the emulating USB hardware device. The one or more input/output ports may be a serial port for non-USB peripheral devices. The one or more input/output ports may be a Point of Sale (POS) cash drawer port that communicates with a POS cash drawer. The one or more input/output ports may connect to an expansion card that can add additional functionality to the emulating USB hardware device. The one or more microcontrollers may be configured to receive a software command to set a control signal that dictates the state of a switching device, connecting either a physical USB host device or the emulated USB hardware device to the physical USB device. The emulating USB hardware device may be configured to receive a set of specific descriptors to emulate a physical USB peripheral device without re-writing firmware. A test executor computing device may monitor received data and filter and display the received data. A USB switching device may be included in the computing system that allows a USB connection with the physical USB peripheral device to be switched between the emulating USB hardware device and a physical host connection, which the emulating USB device is emulating.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 1b illustrate various commands sent between a USB device and a host computing device in order to communicate

FIG. 4a is example pseudo code used to program an example microcontroller for emulating a particular USB peripheral device.

FIG. 4b is a continuation of the example pseudo code from FIG. 4a to program an example microcontroller for emulating a particular USB peripheral device.

FIG. 6a is an example of a POS test case.

DETAILED DESCRIPTION

According to an example embodiment, in order to test systems that require at least one USB peripheral device, there may be an emulated USB peripheral (EUP) hardware device to emulate peripherals and/or host connections. The example hardware device may be referred to by several terms such as: "an emulated USB peripheral (EUP) device," "emulated USB peripheral hardware device," and "emulated USB hardware device." These terms all refer to the same device which may have the capabilities to operate in host or device mode depending on the device's configuration.

An example EUP device may be able to switch between two modes: device mode and host mode. In device mode, an EUP device may be able to emulate a number of different peripherals. In host mode, an EUP device may emulate a host side of a USB connection. There may also be an emulated USB peripheral validation framework that includes an EUP device, a test executor computing device to run test scripts, and a system for which the peripheral interactions are being tested (e.g. the computing device under test).

EUP Device in Device Mode

Figure 1A:
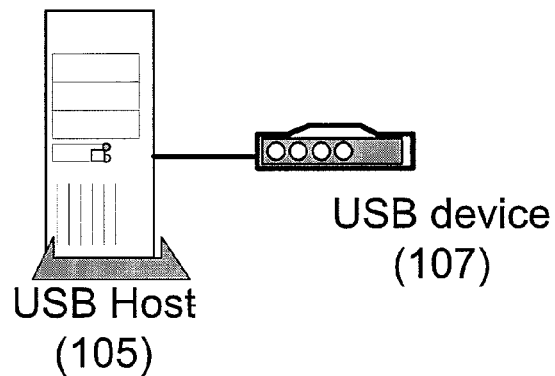
FIG. 1a is a block diagram illustrating a customary enumeration process between a host computing device and a physical USB peripheral device.
Figure 2:
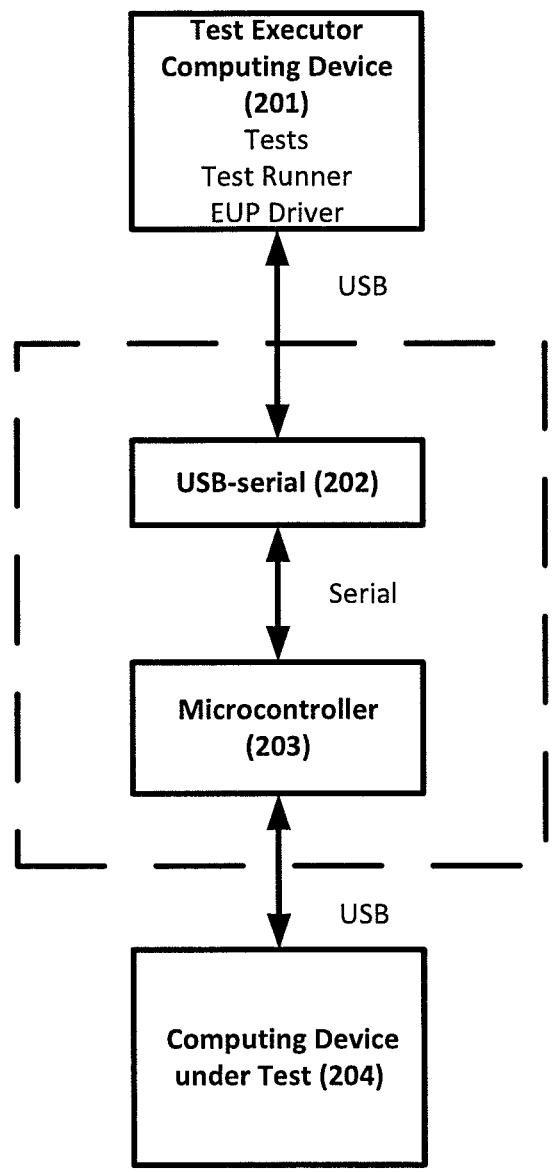
FIG. 2 is a schematic diagram of an example Emulated USB hardware device.

An example emulated USB peripheral hardware device (EUP) may include one or more microcontrollers (203) with USB support and a USB-to-serial interface chip (202) as shown in FIG. 2. USB support may be built-in or may use an external chip. An EUP device may have one microcontroller per USB channel, but may have multiple microcontrollers and USB channels. The serial chip (202) may create a connection with the test executor computing device (201). A test executor computing device (201) is the device that is running the test application and an EUP driver so that an EUP device may interact with a computing device under test (204).

In some embodiments, the EUP device in device mode may not be solely used for testing purposes. For example, an EUP device may be used to emulate peripheral devices that may not be readily available or to interface with legacy computing devices. In these cases, the EUP device may still be connected to a test executor computing device in order to receive commands and connects to a computing device. The EUP device then interacts with the computing device as the peripheral device, which is unavailable or not readily available, or as the interface to a legacy computing device.

The USB support in the microcontroller may allow the microcontroller to attach/detach from the USB, detect resets, receive requests or messages, and to send messages. In device mode, each microcontroller may emulate one instance of a USB peripheral device at a time. A USB interface may automatically receive only packets addressed to the EUP device and break down incoming packets by endpoint. In customary USB devices, all instructions and responses are programmed in firmware and selected parts of messages are forwarded to and from the computing device under test. In an example embodiment, an EUP device runs an application that interacts with the computing device under test to emulate a given USB physical device. Since the EUP device is running an application on top of the firmware, the EUP device can be configured to emulate different devices without re-writing the firmware stored on the microcontroller.

Figure 3:
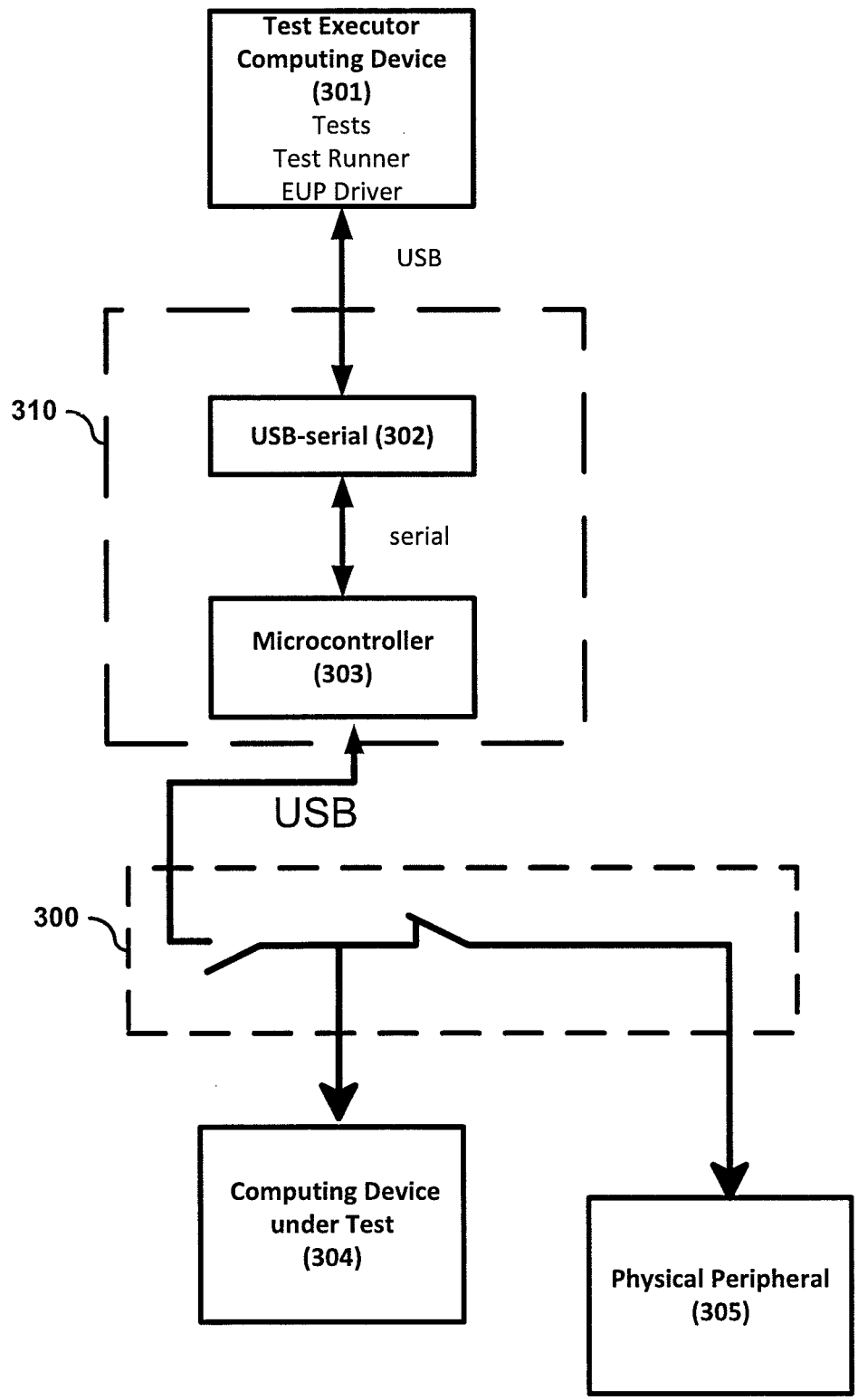
FIG. 3 is a schematic diagram of an example Emulated USB hardware device with a USB switching device.

In some embodiments, there may be a USB switching device (300) that is controlled by the EUP device (310) as illustrated in FIG. 3. An example switching device (301) may be implemented as a hardware component that connects or disconnects a physical peripheral (305) to an example system. This switching device (300) may allow a USB connection to be changed between the EUP device (emulated USB peripheral device) (310) and the physical device (305) (USB peripheral), which the EUP device is representing in order to test both interactions within the computing system. An example switching device (300) may have Powered USB connectors for the physical device (305) and power input connectors that connect to the test system. The switching device (300) may only switch the USB signal connections. A software command from a test application may be sent to the EUP device's (310) microcontroller (303) to set a control signal that dictates the state of the switching device to show whether the physical USB peripheral or the emulated peripheral is connected at a given time. An example switching device (300) may default to being connected to the physical device (305) if the EUP test executor computing device (301) is not connected or not being used for tests. When the EUP device (310) is configured for use, the EUP driver software may switch the EUP device (310) into the system. If the test application is not running the software to control the switching device (300) or the EUP device (310) is not powered, the switching device (300) reverts to passing through the connection to the pass through socket.

An example EUP device may include additional inputs/outputs (IO) ports on the microcontroller to provide functionality such as managing power to the computing device or system under test and providing serial ports for non-USB peripheral testing. Each EUP microcontroller can emulate one physical USB peripheral device at a given time. Additionally, while emulating the physical USB peripheral device, the microcontroller can also provide emulation of one or more serial devices and one or more physical contact switching devices. In some embodiments, an input/output port may emulate a POS cash drawer which may sense a signal requesting to open the drawer and generate a signal indicating that the drawer is open, among other things. Furthermore, an input/output port may be used to add an expansion card to the EUP device in order to provide additional functionality, which has yet to be defined.

In order for an EUP device to emulate a peripheral device, an example EUP device's microcontroller may be programmed with generic software that can interpret and respond to the standard USB protocol for interacting with a computing device under test, as well as a serial protocol for interacting with the test executor device. Example code used to configure the microcontroller is illustrated in FIGS. 4a and 4b. A test executor computing device may use this code to load any USB profile including specific descriptors related to a particular USB peripheral device onto a EUP microcontroller. Specific descriptors may include a device ID, strings, and report descriptors; so that the EUP device may emulate a particular model and instance of the particular device. For example, a test executor computing device may provide specific descriptor information to the EUP device for a particular keyboard model as shown in FIG. 4a (401). When the descriptor information is loaded onto the EUP device, the EUP device emulates the functionality of the particular keyboard model for which the descriptor was loaded. There may be a communication protocol between the test executor computing device and the EUP device that defines the packets that the device will either respond to automatically or forward to the test executor computing device. Any command not specified will not issue a response because the physical device may not respond to all commands.

A test executor computing device may specify that a microcontroller automatically respond to certain messages. A test executor computing device may also configure certain USB packets to be send to itself so that the reply can be calculated by a device emulation process running on the test executor computing device. Using a device emulation process on the test executor computing device allows complicated emulation to be done on the device.

An EUP device may emulate any messaging the real USB peripheral device would send in normal operation. Because the descriptor information is loaded onto the EUP device, the enumeration process can be completed without test executor computing device interaction. The USB standard requires a device to perform enumeration within a certain amount of time, such as ten milliseconds. By loading the enumeration data into an example EUP device's memory, the EUP device is able to complete the enumeration within the required timeout period without being dependent on a test runner application responding inside the expected time frame. Other messages, which have a longer response timeout, may be generated by a device emulation process run on the test executor computing device.

Standard USB bus enumeration includes several steps. First, the port to which a USB device is attached alerts a host computing device that a USB device has been connected and the USB device is in a Powered state. Next, the USB host sends commands to the port and assigns a unique address to the USB device. The USB device's state changes to the Addressed state. The USB host reads configuration information from the USB device and decides how the USB device will be used. Then, the USB host assigns a configuration value to the device and sets the state of the device to Configured.

A EUP device responds to the enumeration commands from the computing device under test enumeration using data previously stored by the test executor computing device. The enumeration process may be similar to that of the actual physical peripheral device.

After enumeration, commands are sent from the test application through the EUP device to the computing device or system under test. Responses from the computing device under test are returned to the EUP device, which then returns the responses to the test application. Using this process, the test application can continue to respond appropriately, emulating the device being tested through the EUP device.

In some embodiments, an example emulated USB peripheral validation framework may exist on a test executor computing device. This framework may configure at least one EUP device to emulate a peripheral USB device. The framework may then run a sequence of test cases, handle unexpected output from the test cases if possible, validate that expected results were generated from each test case, and indicate the success or failure of each test case. For example, an example validation framework may be provided to emulate a point of sale (POS) system. To perform a POS system test, an exemplary embodiment may additionally include a point of sale (POS) terminal and a POS controller along with several EUP devices to emulate peripherals such as a keyboard and a scanner. In some instances, the terminal and the controller may be the same system. Additionally, there may be multiple terminals and multiple controllers. An API simulation server may also be used to create an end-to-end test environment. Tests may be performed with the test application validating the behavior of the system under test based on the inputs provided and the behavior of the applications on the system.

The framework may read system configurations and select a test to run. Then the POS terminal may be initialized. The test may be sequenced and then executed. Logs may record transactions and responses as the test executes. The test program may then take the data that has been collected and convert the data into a form for easy validation. Collected data and results may be logged for follow-up investigations. In some instances, if a test did not run correctly, manual intervention may be allowed to correct problems with the system.

Figure 5A:
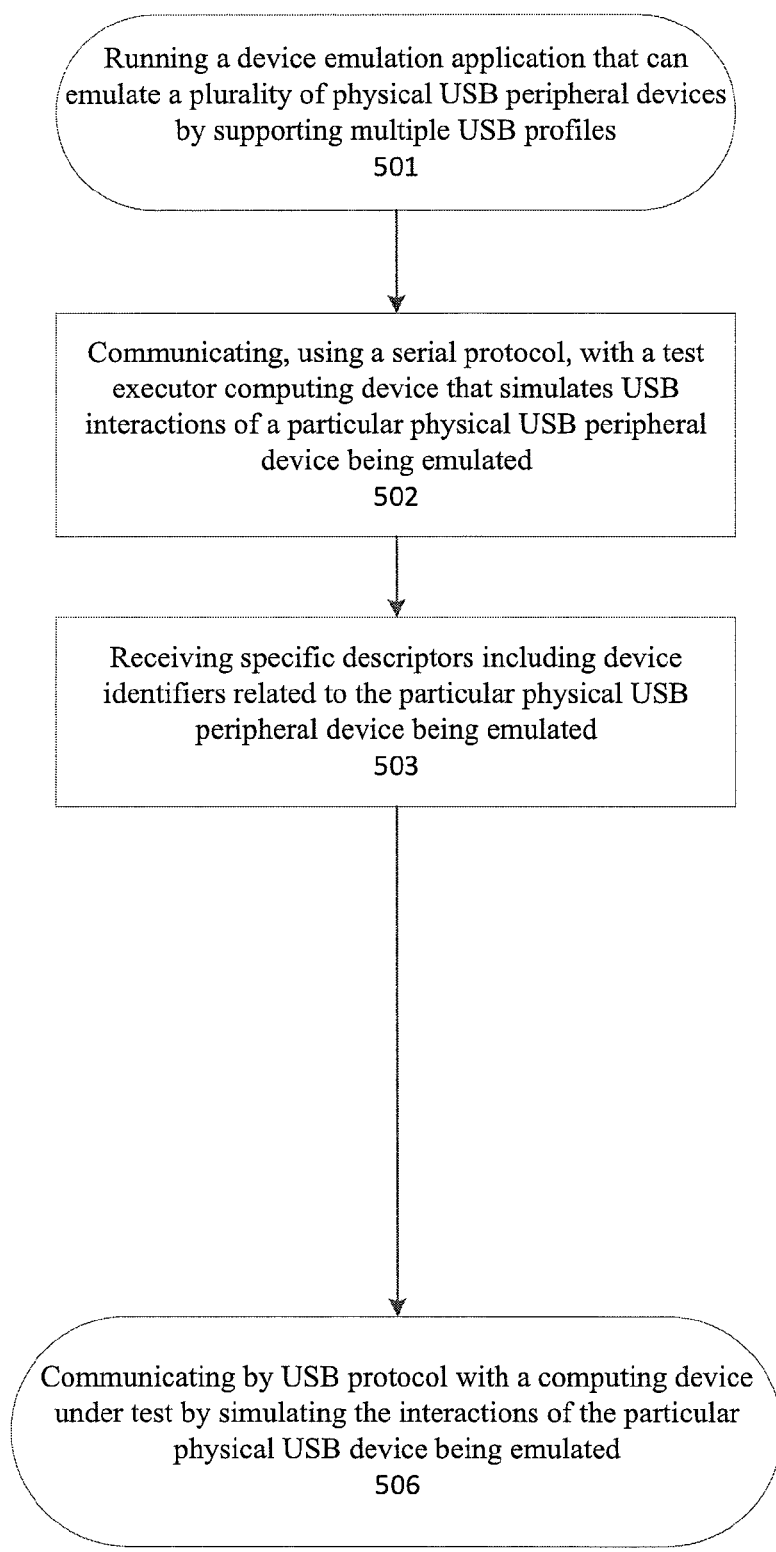
FIG. 5a is a flow diagram of an exemplary method for emulating a universal serial bus peripheral device.

An example method begins in a test executor computing device by connecting the test executor computing device with a microcontroller on an emulated USB peripheral (EUP) device that has USB support and a USB to serial interface chip. The microcontroller may be configured with software, such as a device emulation application, that can emulate a plurality of physical USB peripheral devices by supporting multiple USB profiles as illustrated in FIG. 5a (501). A non-device specific USB application may be stored in Flash memory of the microcontroller. The software may interpret and respond to standard USB protocol for interacting with a computing device under test and a serial protocol for interacting with a test executor computing device. The microcontroller may communicate, using the serial protocol, with the test executor computing device that simulates USB interactions of a particular physical USB peripheral device being emulated (502). Specific descriptors, which define a USB profile, are loaded into the EUP device's microcontroller (503). The device configuration defined by the specific descriptors may be stored in the microcontroller's RAM. These descriptors include a device identifier related to the actual USB device that the microcontroller should emulate. In this example case, the microcontroller is loaded with the device ID of a POS scanner. Then, messages can be sent between the emulated device to the computing device under test to emulate actual messages between the real USB peripheral device and the computing device under test (506). Output for the peripheral device may be received from the computing device under test by the microcontroller and forwarded to the test executor computing device.

Figure 6B:
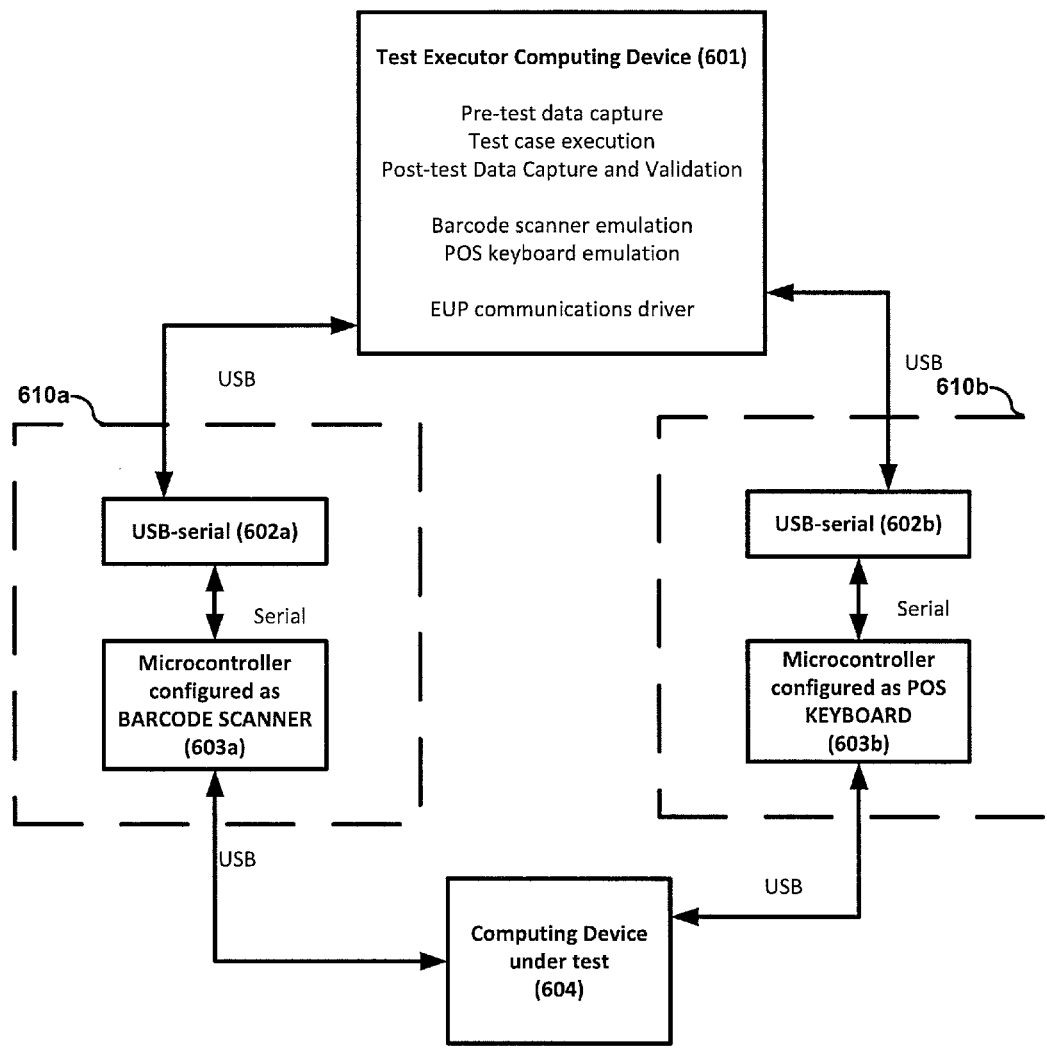
FIG. 6b is an example block diagram of components for a POS test.

FIG. 6a illustrates an example test case for a POS system. In this test case, a loyalty card is simulated as having been scanned and then two Universal Product Codes (UPCs) are simulated as having been scanned as the items being purchased. FIG. 6b illustrates the example system. A test executor computing device (601) may run one process that contains a testing framework, device emulations, and an EUP device communications driver. Alternatively, a test executor computing device (601) may run different processes for the framework, emulations, and communications drivers. An example testing framework may include: pre-test data capture, test case execution, and post-test data capture and validation. In an example system, such as the one illustrated in FIG. 6b, there may be more than one EUP device (610a, 610b) to emulate multiple peripheral devices in the system at a given time. For example, as shown in FIG. 6b, one EUP device may emulate a barcode scanner USB device (610a) and another EUP device may emulate a POS keyboard (610b). Device emulations may be stored and sent via the test executor computing device. A test executor computing device (601) will have an EUP device communications driver to communicate with the EUP devices. There may be a thread of execution for each EUP device and there may be coordination/communication between the EUP devices using input/output data. In some embodiments, one EUP device may output data that is used to time or select a response from a second EUP device. For example, in an example POS system, there may be a WAIT light on the keyboard, which if activated, stops the scanner from accepting any more scans. The software uses this relationship to avoid over-running the POS input buffer. Alternatively, an example embodiment may read the display of a POS system to determine the next key to send when there has been an error message or prompt.

In this test case, the EUP device emulating the scanner (610a) is expected to correctly send messages that identify the loyalty card by a numeric identifier and the identifiers of the two products scanned. The EUP device emulating the keyboard (610b) is expected to correctly send input strings corresponding to keyboard keys being pressed and release for "QTY," and "TOTAL." CashOut may be a smart routine that looks at the display and then sends the right entry through the keyboard. Validation may determine that a test has performed as expected. Validation may include: verifying that the transactions have occurred as expected, that the number of coupons applied is correct, or that the customer number recognized by the peripheral device is right.

An EUP device can emulate one peripheral device per microcontroller at a given time. If an EUP device contains more than one microcontroller, the EUP device may emulate different peripheral devices simultaneously, assigning one peripheral device to each microcontroller.

As discussed in the POS system example, computing systems may need to test multiple peripheral device interaction. A computing system may need to test functionality with a mouse, a keyboard, and a printer. In one embodiment, one EUP device may be used to test each device in serial fashion. The EUP device may be programmed to emulate each peripheral at a different time. For example, the EUP device may first emulate a mouse, then a keyboard, then a printer. Alternatively, multiple EUP devices may be used to emulate multiple peripheral devices within the computing system. For example, three EUP devices may be used to emulate the mouse, keyboard, and printer respectively. The computing system may then perform parallel testing of multiple interactions with peripheral devices. By emulating multiple peripherals, indicators from the operating system of the computing device under test, such as status lights, can be used to regulate the rate of information set to other peripherals such as keyboards or scanners.

EUP Device in Host Mode

Figure 7:
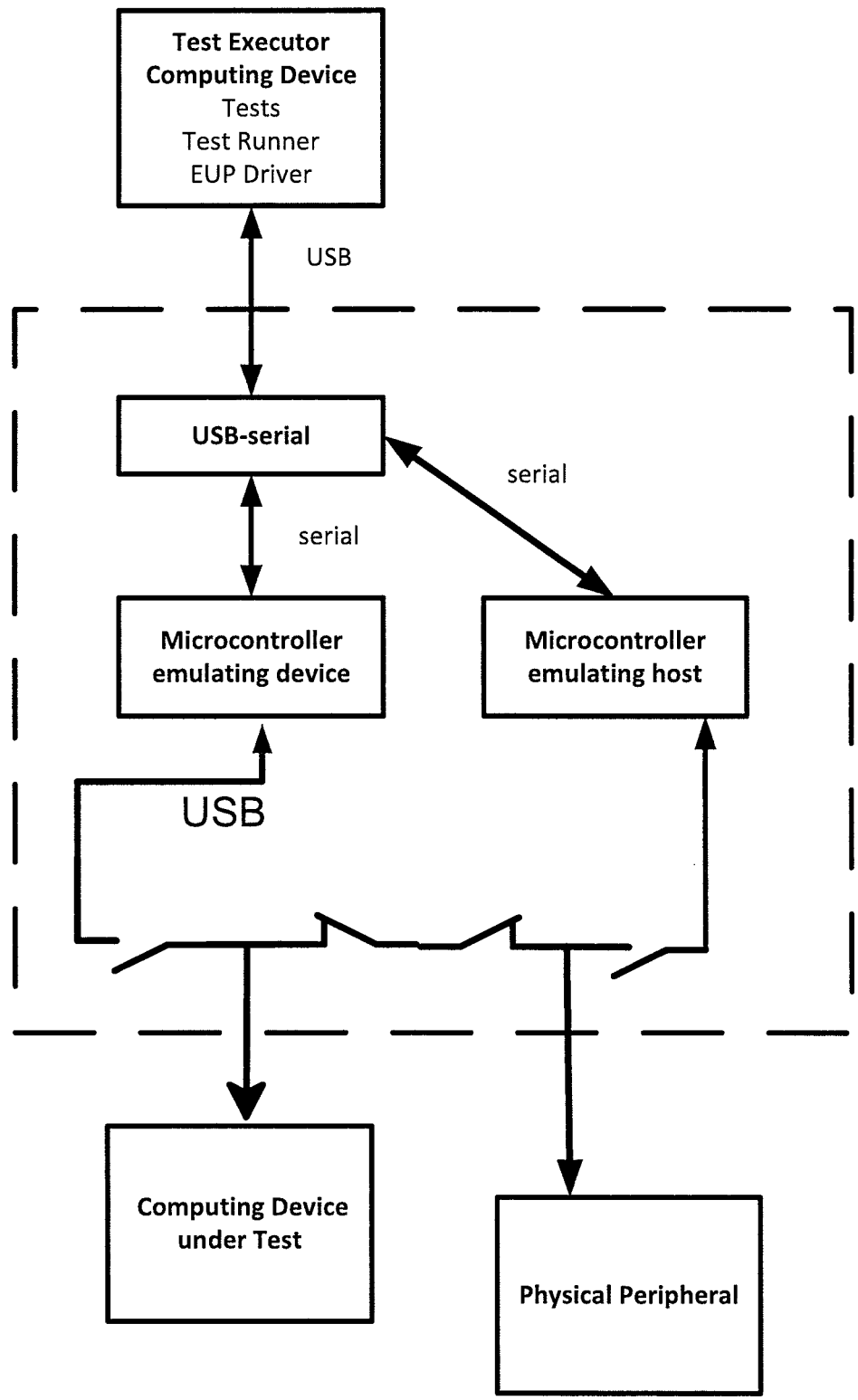
FIG. 7 is a schematic diagram of an example Emulated USB hardware device emulating a host side of a USB connection.

In some embodiments, an EUP device may emulate a host side of a USB connection as illustrated in FIG. 7. An EUP device may incorporate all the features discussed above with respect to device mode. Additionally, an EUP device's microcontroller port may implement USB on the go so that the device can act as a peripheral in device mode or a host end of a USB device in host mode.

Figure 5B:
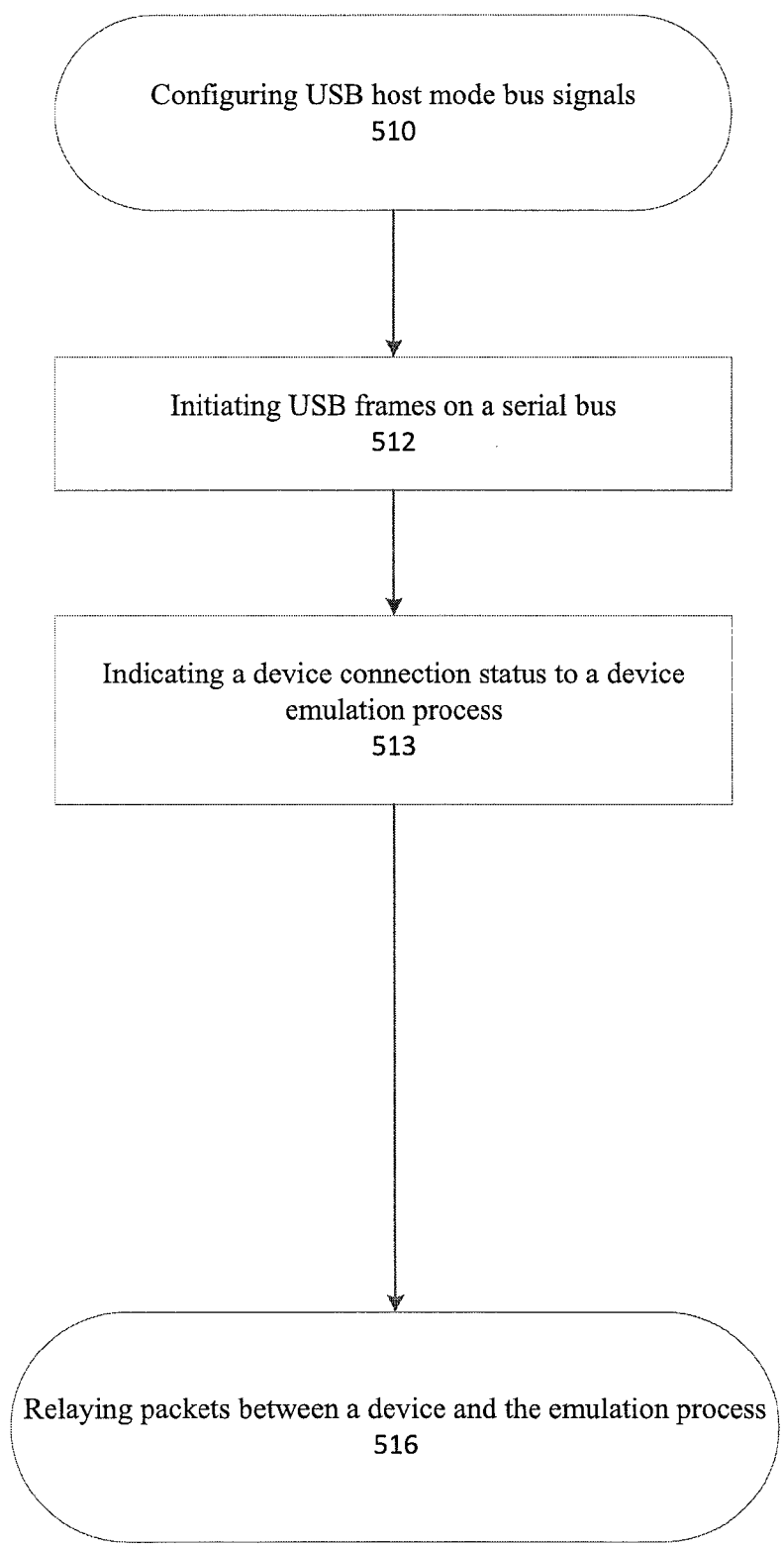
FIG. 5b is a flow diagram of an exemplary method for emulating a universal serial bus connection.

In order to emulate a host connection, an EUP microcontroller may receive software that configures USB host mode bus signals (510), initiates USB frames on the bus (512), indicates device status (connection or disconnection) to an emulation process (513), and relays packets between a device and the emulation process (516) as illustrated in FIG. 5b. Host mode bus signal lines D+ and D− may be pulled down with 15 k resistors and USB frame packets may be generated at 1 khz or 8 khz. The USB interface of an EUP device in host mode may send packets to a particular device and endpoint. Packet buffers may therefore be handled differently in host mode than they are in device mode. In an example EUP device, a microcontroller may have a buffer descriptor table (BDT) to track memory used for each endpoint (each device) or outgoing packets (host). If a packet is being sent and is fixed data, it may be sent from a table in program space instead of RAM. Additionally, the device may also be able to change dynamically between device mode and host mode.

A switching device may allow the switching of either a particular physical USB host device or an emulated USB hardware device to be connected to physical USB peripheral device. This switching device may be similar or the same as the switching device discussed above with respect to the EUP device emulating a physical USB peripheral device.

There may be an additional switching device to connect a physical peripheral with an EUP device configured in USB host mode. As shown in FIG. 7, one microcontroller of the EUP device may be in host mode and connected to a test executor computing device which is also connected to a second microcontroller of the EUP device, which is emulating a USB device (device mode). The EUP device's microcontroller in device mode may be connected to a computing device under test. This configuration may allow data to be traced through the system similar to a bus analyzer. Data for emulating a new device may be collected via the EUP device without any additional hardware. A test executor computing device may monitor received data and filter and display the received data. The system configuration of FIG. 7 may also allow data from a USB peripheral device to be modified by the software running the EUP device. For example, an emulating USB device may reverse the reported movement directions of a USB mouse so that the mouse can be turned upside down and used as a trackball. Additionally or alternatively, the combination of the two microcontrollers (or two EUP devices) may be used to selectively pass data depending on the intended function. Although FIG. 7 depicts one EUP device with two microcontrollers: one in device mode and one in host mode, a similar configuration may be implemented using two EUP devices or an EUP device with more microcontrollers. For example, one EUP device may be configured in host mode and the other EUP device may be configured in device mode. Alternatively, an EUP device may have four channels with one microcontroller per channel. This example device may provide two instances of bus analyzer mode, with each instance needing a host and device channel.

Switching Between Host and Device Mode

When the USB interface is configured for host mode, the proper USB pull-down resistors are configured, and USB frames are generated on the bus. When a device is connected, a message is sent to the executor which then initiates the enumeration process. A software command from the executor may instruct the microcontroller whether to be in device or host mode.

High-Level Block Diagram

Figure 8:
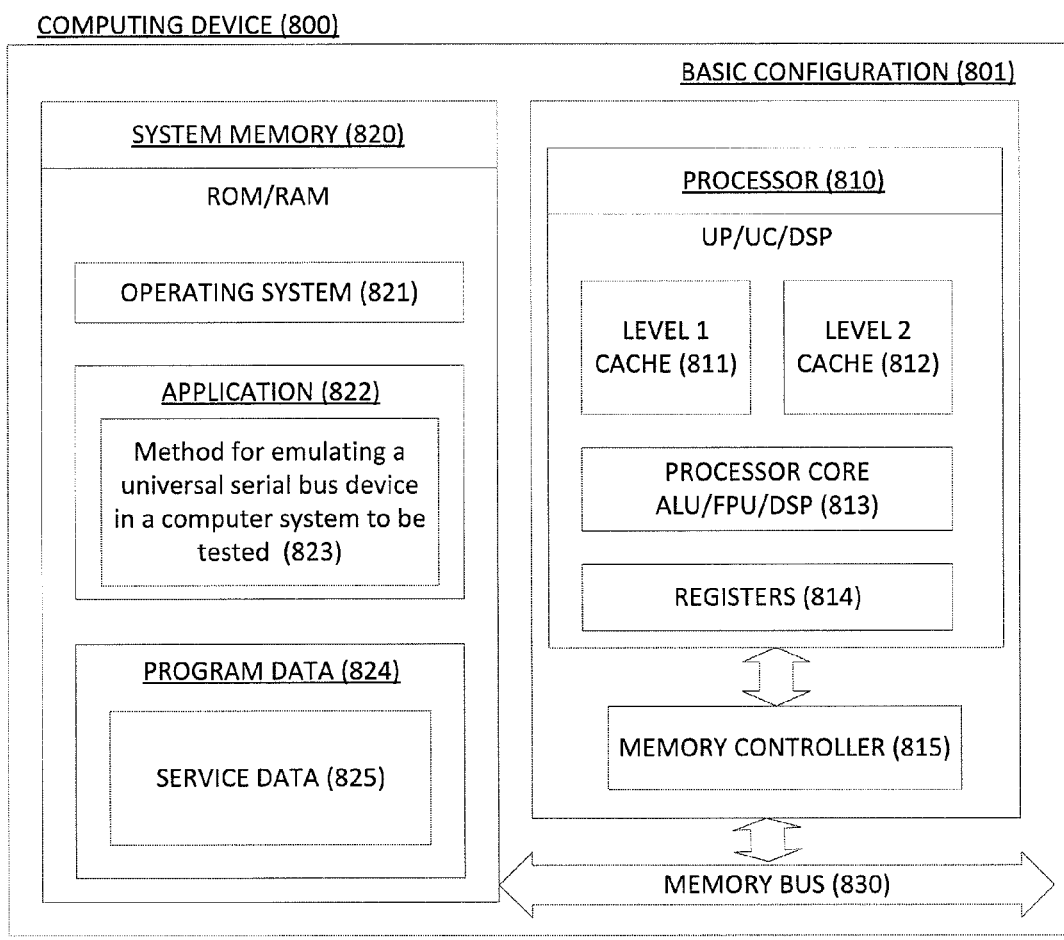
FIG. 8 is a block diagram illustrating an exemplary computing device.

FIG. 8 is a high-level block diagram of an example computer (800) that is arranged for emulating a universal serial bus device in a computer system to be tested. In a very basic configuration (801), the computing device (800) typically includes one or more processors (810) and system memory (820). A memory bus (830) can be used for communicating between the processor (810) and the system memory (820).

Depending on the desired configuration, the processor (810) can be of any type including but not limited to a microprocessor (µP), a microcontroller (µC), a digital signal processor (DSP), or any combination thereof. The processor (810) can include one more levels of caching, such as a level one cache (811) and a level two cache (812), a processor core (813), and registers (814). The processor core (813) can include an arithmetic logic unit (ALU), a floating point unit (FPU), a digital signal processing core (DSP Core), or any combination thereof. A memory controller (816) can also be used with the processor (810), or in some implementations the memory controller (815) can be an internal part of the processor (710).

Depending on the desired configuration, the system memory (820) can be of any type including but not limited to volatile memory (such as RAM), non-volatile memory (such as ROM, flash memory, etc.) or any combination thereof. System memory (820) typically includes an operating system (821), one or more applications (822), and program data (824). The application (822) may include a method for emulating a universal serial bus hardware device. Program Data (824) includes storing instructions that, when executed by the one or more processing devices, implement a method for emulating a universal serial bus hardware device in a computing device under test. (823). In some embodiments, the application (822) can be arranged to operate with program data (824) on an operating system (821).

The computing device (800) can have additional features or functionality, and additional interfaces to facilitate communications between the basic configuration (801) and any required devices and interfaces.

System memory (820) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of the device (800).

The computing device (800) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (800) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An emulating universal serial bus (USB) hardware device that emulates a host connection of a USB device in a computing system, the emulating USB hardware device comprising:
 a memory to store configuration descriptors;
 a USB to serial interface chip; and
 one or more microcontrollers with USB support that are programmable with software to emulate a host connection of a physical USB device by receiving software that:

configures USB host mode bus signals,
initiates USB frames on a serial bus,
indicates a device connection status to a device emulation process, and
relays packets between a physical USB device and the device emulation process,
wherein the one or more microcontrollers is further configured to receive a software command to set a control signal that dictates the state of a switching device, connecting either a physical USB host device or the emulated USB hardware device to the physical USB device.

2. The emulating USB hardware device of claim 1, further comprising:
one or more input/output ports on the one or more microcontrollers that provides functionality for the emulating USB hardware device.

3. The emulating USB hardware device of claim 2, wherein the one or more input/output ports controls power to the emulating USB hardware device.

4. The emulating USB hardware device of claim 2, wherein the one or more input/output ports is a serial port for non-USB peripheral devices.

5. The emulating USB hardware device of claim 2, wherein the one or more input/output ports is a Point of Sale (POS) cash drawer port that communicates with a POS cash drawer.

6. The emulating USB hardware device of claim 2, wherein the one or more input/output ports connects to an expansion card that can add additional functionality to the emulating USB hardware device.

7. The emulating USB hardware device of claim 1 further configured to:
receive a set of specific descriptors to emulate a physical USB peripheral device without re-writing firmware.

8. A computer system for testing peripheral device interaction and host connections, the computing system comprising:
a test executor computing device configured to run a testing framework, host connections, and emulating USB hardware device communication drivers;
a computing device under test;
a physical USB peripheral device;
at least one emulating universal serial bus (USB) hardware device that is programmable with software to emulate a host connection of a physical USB device, wherein the at least one emulating universal serial bus hardware device is configured to:
configure USB host mode bus signals;
initiate USB frames on a serial bus;
indicate a device connection status to a device emulation process; and
relay packets between the physical USB peripheral device and the device emulation process; and
a USB switching device that allows a USB connection with the physical USB peripheral device to be switched between the emulating USB hardware device and a physical host connection.

9. The computer system of claim 8, wherein the test executor computing device monitors received data and filters and displays the received data.

10. The computer system of claim 8, wherein the at least one emulating universal serial bus hardware device is further configured with one or more input/output ports that provides functionality for the at least one emulating USB hardware device.

11. The computer system of claim 10, wherein the one or more input/output ports controls power to the at least one emulating USB hardware device.

12. The computer system of claim 10, wherein the one or more input/output ports is a serial port for non-USB peripheral devices.

13. The computer system of claim 10, wherein the one or more input/output ports is a Point of Sale (POS) cash drawer port that communicates with a POS cash drawer.

14. The computer system of claim 10, wherein the one or more input/output ports connects to an expansion card that can add functionality to the at least one emulating USB hardware device.

* * * * *